Nov. 18, 1969  J. TAYLOR ET AL  3,479,273
APPARATUS FOR ELECTRO-CHEMICAL MACHINING WITH A ROTATING
GROOVED ELECTRODE TOOL
Filed Nov. 23, 1966
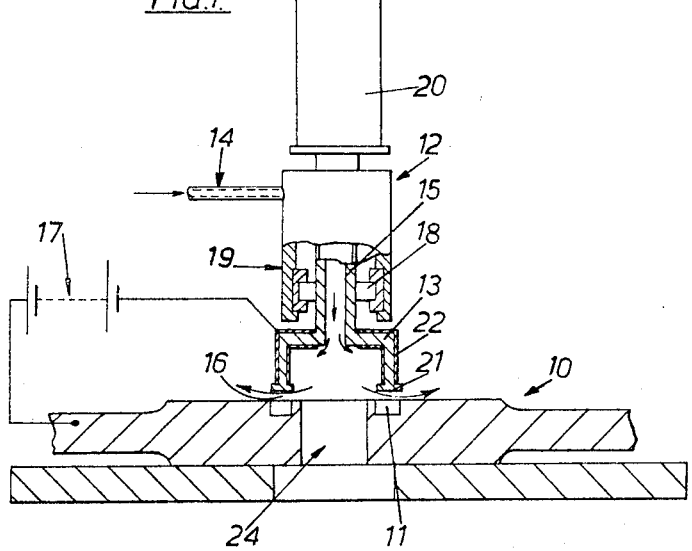
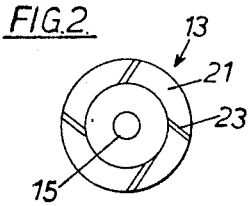
Inventors
John Taylor
Ronald Purcell
By
Cushman, Darby & Cushman
Attorneys

# United States Patent Office 3,479,273
Patented Nov. 18, 1969

3,479,273
APPARATUS FOR ELECTRO-CHEMICAL MACHINING WITH A ROTATING GROOVED ELECTRODE TOOL
John Taylor and Ronald Purcell, Derby, England, assignors to Rolls-Royce Limited, Derby, Derbyshire, England, a British company
Filed Nov. 23, 1966, Ser. No. 596,513
Claims priority, application Great Britain, Dec. 9, 1965, 52,380/65
Int. Cl. B23p 1/16, 1/14
U.S. Cl. 204—224     8 Claims

ABSTRACT OF THE DISCLOSURE

Apparatus and method for electro-chemically machining a workpiece utilizing a cathode placed adjacent a workpiece and forming a gap of predetermined length therebetween, said gap being adjustable as the machining operation proceeds. Electrolyte is supplied to the gap via a chamber centrally disposed within the cathode, the electrolyte being supplied to the chamber at a relatively low pressure. The chamber is rotated at a speed sufficiently high to cause the electrolyte to pass radially outwardly through the gap at a high centrifugal pressure.

---

This invention comprises improvements in or relating to electro-chemical machining.

Broadly, the invention provides a method of electro-chemically machining a workpiece in which the electrolyte is supplied via a chamber to a substantially annular gap between the workpiece and the machining cathode the electrolyte being supplied to the chamber at a relatively low pressure, the chamber being disposed radially inwardly with respect to the gap and being rotated about an axis perpendicular to the plane of the gap, whereby electrolyte flows radially outwardly under a relatively high centrifugal pressure through the gap. In another aspect, the invention provides apparatus for electro-chemically machining a workpiece comprising a cathode, means for mounting a workpiece adjacent to said cathode to be spaced from the latter by a gap, means defining a chamber disposed radially inwardly of the radially outer edge of the gap, means for supplying electrolyte to said chamber at a relatively low pressure and drive means for rotating said chamber about an axis perpendicular to the gap, such that rotation of the chamber produces a flow of electrolyte through said gap under relatively high centrifugal pressure and a plurality of grooves in said cathode working surface adapted to guide electrolyte flow over the surface of said workpiece. In a preferred embodiment, the said chamber is constituted by the hollow interior of the machining cathode.

In a preferred embodiment grooves are formed in the working surface of the cathode, the said grooves being so oriented as to guide electrolyte flow over the surface of the workpiece.

The apparatus preferably includes means for advancing the cathode and the workpiece relatively towards each other as erosion of the latter takes place so as to form an annular cavity in the workpiece in operation of the apparatus.

The invention will be described, by way of example only, with reference to the accompanying drawings, in which:

FIGURE 1 is a diagrammatic sectional view of apparatus according to the invention for electro-chemically machining a workpiece, and FIGURE 2 is an end view of the machining cathode of the apparatus shown in FIGURE 1.

The apparatus is adapted to machine electrolytically a workpiece 10, comprising, in this example, a compressor or turbine rotor disc of a gas turbine engine. Specifically, the apparatus is designed to machine an annular slot 11 in one face of the workpiece 10, the slot 11 being concentric with the axis of the disc workpiece 10.

With the materials currently used in compressor and turbine rotor discs, it is difficult to machine annular slots 11, particularly slots of rectangular section, by conventional methods, and for its solution the problem lends itself to an electro-chemical machining technique. The electro-chemical machining apparatus according to the invention is indicated generally at 12 and comprises a hollow cylindrical machining cathode 13 which is linearly movable (by means not shown) relatively towards and away from the workpiece 10. Electrolyte is supplied to the interior of the cathode 13 from an electrolyte supply line 14 through a hollow stem 15 communicating with the hollow interior of the cathode 13 and extending axially with respect thereto. In operation, an annular gap 16 is maintained between the workpiece 10 and the cathode 13, electrolyte passing radially outwardly through the annular gap 16, as indicated by the arrows, and the cathode 13 being maintained at a D.C. negative potential with respect to the workpiece 10 by means indicated diagrammatically at 17.

It has been found that, when the hollow cathode 13 is advanced towards the workpiece 10 as the erosion of the latter proceeds during the machining operation, it is necessary to supply the electrolyte at a high pressure, the pressure required increasing as the depth of the machined slot 11 increases. Such high pressures are undesirable, as they lead to high back pressures in the electrolyte supply line 14 and necessitate supporting jigs for the workpiece 10 and machining apparatus 12 of exceptionally high rigidity.

It is proposed by the present invention to circumvent the need for supplying electrolyte at high pressure by generating a pressure of electrolyte across the annular machining gap 16 centrifugally. Thus the hollow cathode 13 is mounted for rotation about its axis, the axial hollow stem 15 of the cathode 13 being supported in roller bearings 18 from a fixed casing 19. The stem 15 and hollow cathode 13 are rotated, at a high speed, typically 5000 r.p.m., by an electric motor 20.

In operation of the apparatus, electrolyte supplied through the pipe 14 passes into the hollow interior of the cathode 13 through the hollow stem 15 and is forced centrifugally against the internal surface of the cathode 13, thence passing radially outwardly through the annular gap 16 at a rate which is considerably enhanced by the centrifugal action of the rotating cathode 13. In this way, a high flow of electrolyte is maintained without the need for a high static pressure in the electrolyte supply line 14.

To machine a slot of rectangular cross section, as illustrated in FIGURE 1, the hollow cathode 13 is provided with a plane working surface 21, illustrated in plan in FIGURE 2. The internal and external surfaces of the cathode 13 are covered with an insulating coating 22, only the working surface 21, and a small area of the internal and external surface of the cathode 13 adjacent the working surface 21, being left uncovered. The depths, measured axially of the cathode 13, of the uncovered areas in the region of the working surface 21 determine the radial width of the resulting groove 11, since the greater the depths of these uncovered areas the longer will any given part of the workpiece 10 be exposed to the uncovered surface of the cathode 13 and the greater, therefore, will be the electrolytic erosion of the workpiece 10 radially.

The slot machined by the cathode 13 as described above is not accurately rectangular in cross section, but tends to increase in radial width as the depth of the slot 11 increases. This is thought to be due to the build-up of electrolytic products as the machining proceeds. Such a build-up of products can be minimised by providing a plurality of substantially tangential grooves 23 in the working surface 21 of the cathode 13. The grooves 23 may comprise, for example, shallow saw cuts in the working surface 21. Said grooves 23 tend to assist the centrifugal flow of electrolyte through the gap 16 over the surface of the workpiece 10, thereby minimising the deposition of electrolytic products.

Instead of supplying electrolyte to the interior of the hollow electrode 13 by way of a hollow stem 15, electrolyte could be supplied through a central hole 24 in the workpiece, the stem 15 in this case being, of course, solid, and the electrolyte supply line 14 dispensed with.

It can be appreciated that non-circular annular slots can be machined by the use of a cylindrical chamber with an insulating coating rotating within a stationary cathode, the uninsulated surfaces of the latter being such as to form the required slot.

We claim:
1. Apparatus for electro-chemically machining a workpiece comprising a cathode having a generally annular working surface, means for mounting a workpiece adjacent to said working surface, said workpiece and said working surface defining a predetermined gap therebetween, means defining a chamber disposed radially inwardly of a radially outer edge of said cathode, conduit means for supplying electrolyte to said chamber at a relatively low pressure, drive means for rotating said chamber about an axis perpendicular to the plane of said gap at a rotational speed sufficient to produce a flow of electrolyte from said chamber radially through said gap under a relatively high centrifugal pressure and a plurality of grooves in said cathode working surface extending from said radially inner edge to said radially outer edge of said cathode adapted to guide electrolyte flow over the surface of said workpiece.

2. Apparatus according to claim 1 wherein the cathode has a plane working surface.

3. Apparatus as claimed in claim 1 including means for advancing the cathode and the workpiece relatively towards each other as erosion of the latter takes place to form a cavity in the workpiece in operation of the apparatus.

4. Apparatus as claimed in claim 1, in which the cathode has a hollow interior, which is so disposed that the said gap is substantially annular in shape.

5. Apparatus as claimed in claim 4 wherein the cathode is provided with an insulating covering on its internal and external surfaces, the region of the working surface of the cathode adjacent the workpiece being uncovered.

6. Apparatus as claimed in claim 4 wherein said cathode working surface has a plurality of substantially tangential grooves.

7. Apparatus as claimed in claim 4 in which the said chamber is constituted by the hollow interior of the machining cathode.

8. Apparatus as claimed in claim 7 in which the electrolyte is supplied to the interior of the cathode through a hollow stem supporting the cathode and extending perpendicular to the plane of the gap, the stem being drivingly connected to said drive means.

References Cited
UNITED STATES PATENTS

| | | | |
|---|---|---|---|
| 3,345,281 | 10/1967 | Falls | 204—212 |
| 3,243,365 | 3/1966 | Aikin | 204—143 |
| 3,338,808 | 8/1967 | Johnson | 204—143 |

JOHN H. MACK, Primary Examiner
S. KANTER, Assistant Examiner

U.S. Cl. X.R.
204—143, 280